Patented May 25, 1926.

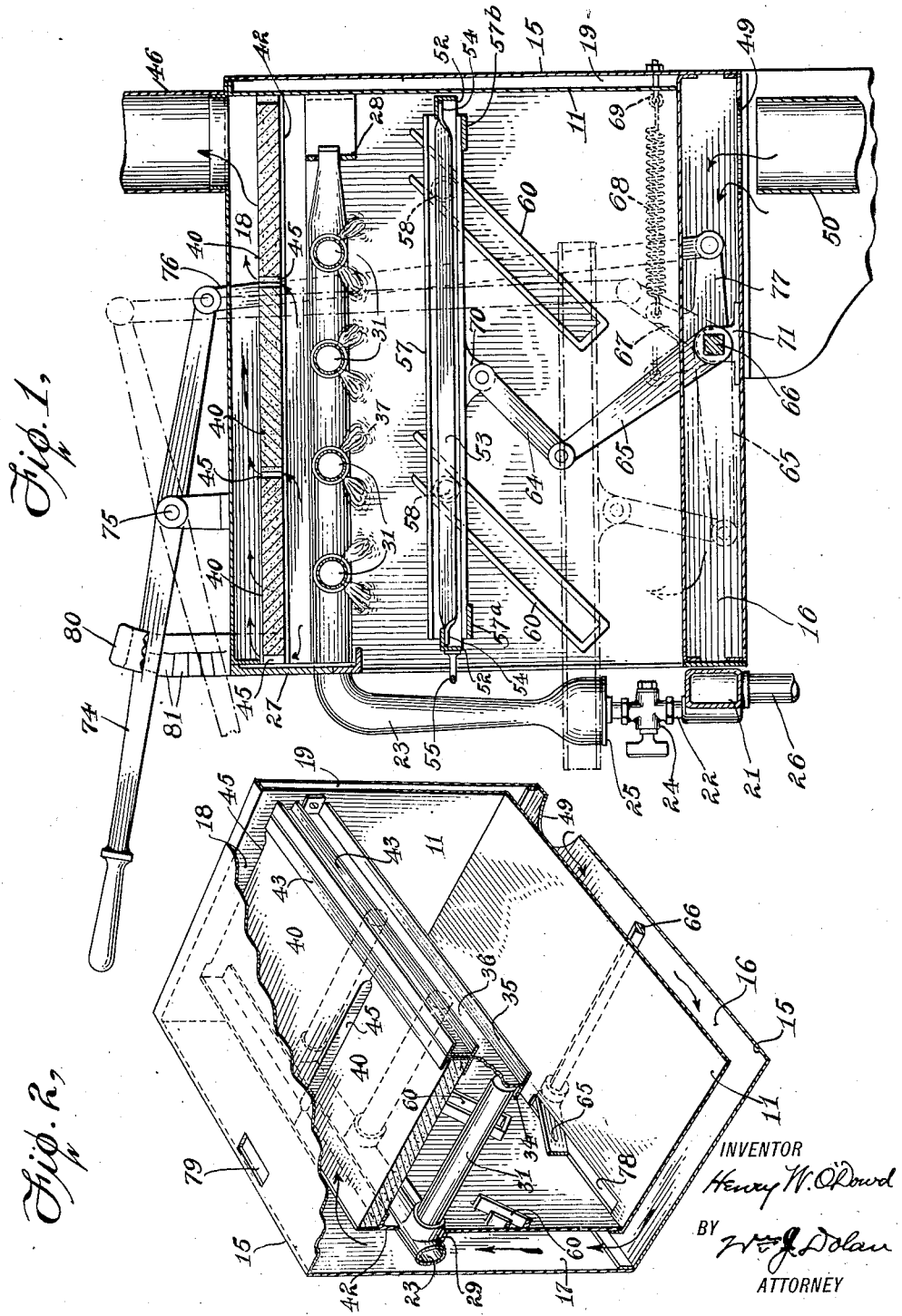

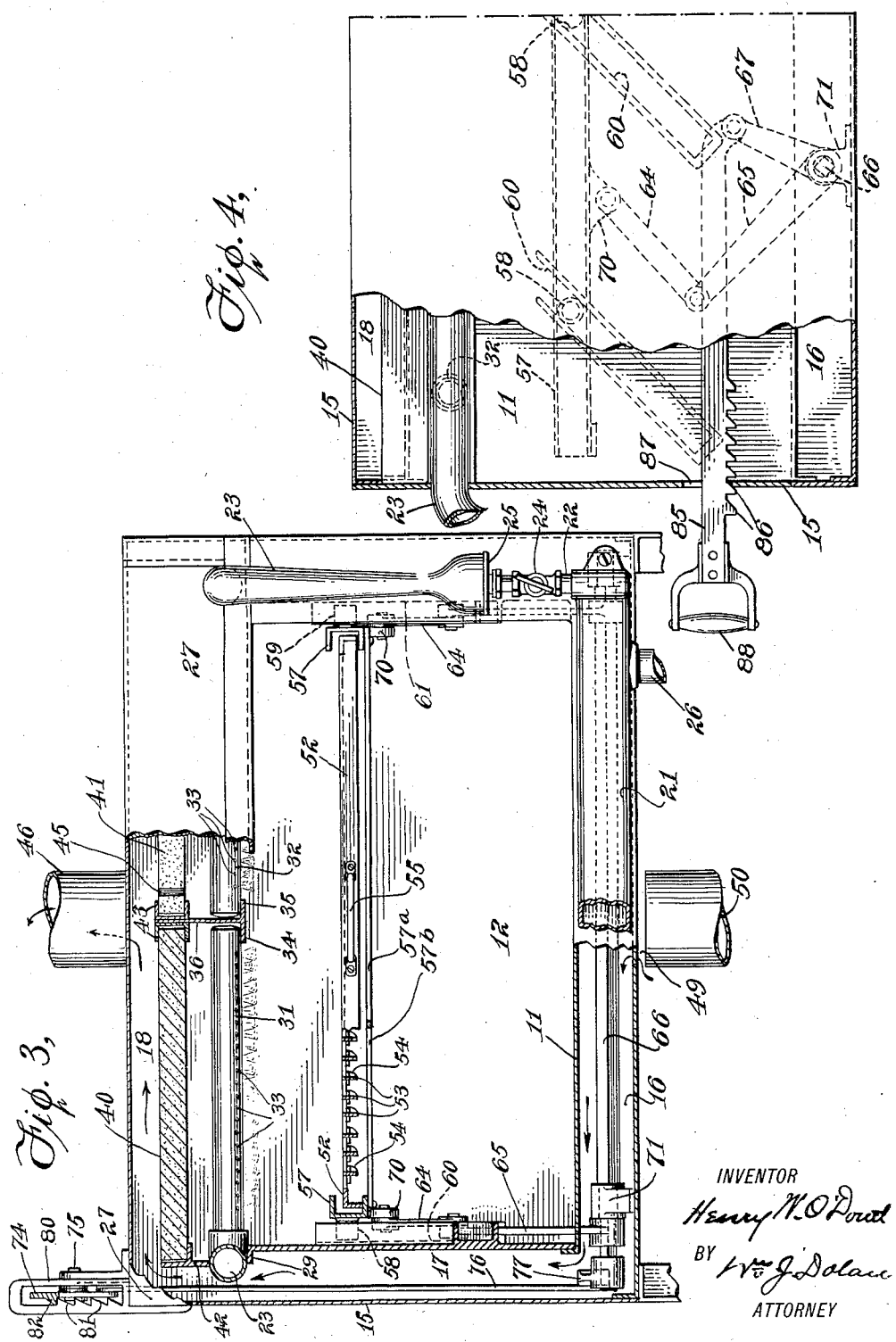

1,586,324

UNITED STATES PATENT OFFICE.

HENRY W. O'DOWD, OF JERSEY CITY, NEW JERSEY, ASSIGNOR, BY MESNE ASSIGNMENTS, TO STANDARD GAS EQUIPMENT CORPORATION, OF BALTIMORE, MARYLAND, A CORPORATION OF MARYLAND.

HEATING APPARATUS.

Application filed March 1, 1919. Serial No. 279,964.

The invention, generally speaking, pertains to the art of cooking by the direct action of heat obtained from a clear fire, to which the food is exposed by placing it within the radiant zone thereof, upon a gridiron or similar supporting member. More particularly, the invention relates to an improved method of generating the heat and distributing it throughout the broiler, and further to improvements in the mechanism for raising and lowering the gridiron, including means for adjusting the latter as required inside and outside the heat zone.

Primarily, the invention has for its object to provide a self-ventilating broiler, affording a pure internal atmosphere such as will cause the fuel burned therein to yield a bright flame always, without fumes or vapors likely to impair the quality or flavor of the viands that are being broiled.

A secondary object is the provision of means whereby the broiler may be heated both from within and from without, and the temperature thereof raised or lowered in accordance with diverse requirements, to the end that the cooking be promptly as well as effectively carried out, while permitting conservation of heat by curtailment of the supply as soon as the broiling is completed.

A further object is to produce a broiler of strong and durable construction, simple and convenient to manipulate, smooth working, and equipped with a well-poised, adjustable grid, readily adapted to the introduction, inspection, turning over, and removal of the food subjected to the broiling operation.

Other objects and advantages of the invention will in part be obvious, and in part be brought out in the description hereinafter contained.

Gas is consumed, in preference to other fuel, in the herein disclosed type of broiler, because it permits exposure of the food to the action of the heat directly under the flame and thus precludes the waste of fats or drippings falling therein, as happens in apparatus burning coal or coke, where the food must be held over or in front of the fire. However no restriction in the scope of the invention is intended in this respect, as it can be applied to different forms of broiling apparatus, with appropriate modifications.

A feature of the present invention is that it provides means for segregating the smoke and other products of combustion from the flame in the broiler, by enabling them to rise instantaneously therefrom, so that none but a clean burning fire is allowed to reflect and radiate heat upon the food placed under the same.

Another feature consists in supplementing the segregating means aforesaid by a draft promoting structure designed to accelerate the elimination of the products of combustion from the flame, and further to heighten the temperature in the broiler through the admission therein of heat units derived from an external source.

Still another feature resides in the supplying of semi-yielding and semi-rigid supports for the gridiron, which enable it to remain properly seated at all points in or out of the heat zone, without danger of becoming unbalanced either on account of the volume of food placed thereon, or from continued flexure of parts that are weak-jointed and carelessly assembled.

Referring to the drawings hereto annexed for a detailed description of the invention, Fig. 1 is a sectional side elevation, illustrating a practical form of broiler in which the invention has been embodied;

Fig. 2 is a perspective view, showing the left side of the same form of broiler, certain parts being omitted and others broken away;

Fig. 3 is a front view, partly in elevation and partly in section; and

Fig. 4 is a side elevation of a broiler slightly modified in form, the forward part thereof being broken and partly sectioned to show the internal construction.

The same reference numerals are employed to designate corresponding parts in the several figures.

As represented in the said drawings, the improved broiler comprises a casing 11, which may be of conventional quadrangular form, and composed as usual of metal plates or sheets suitably fastened to one another. This casing is left open in front, as at 12, unless it be desired to use the same for a baking oven, or otherwise than for broiling, in which case a door will be provided to close the front.

Preferably, and as shown, the said casing is surrounded by a jacket 15, spaced from the body thereof at the bottom, sides and top, so as to produce external heat-conveying passages 16, 17, and 18 therearound, to which further reference will be made hereinafter. Another space, as 19, is also formed at the back of the casing, between the latter and the rear wall of the said jacket, and constitutes a means of insulation for that part of the broiler.

The upper part of the casing 11 is used as a combustion chamber, wherein is generated the fire to perform the broiling. As before stated, the fuel preferably employed for this purpose is gas, either natural or artificial, which is conveyed to the place of combustion from a manifold 21, through pipes 22 and 23 respectively, interconnected by valved couplings 24 and air-mixers 25. The manifold is positioned at or near the base of the casing in front, below its entrance 12, and supplied from a main pipe 26. The upper pipes 23 rise by the sides of the casing, which they enter through apertures provided therefor in a cross-piece 27, above the said entrance. Thence the pipes run horizontally through the upper part of the casing, where they are sustained in an elevated position by the said cross-piece and a rear support 28, parallel to the latter, into which support the extremities of the pipes are made to project. Intermediately thereof, these pipes are arranged to bear upon outwardly-turned flanges 29, formed at the upper edges of the casing, on opposite sides.

Two series of burners 31 and 32 extend inwardly from the horizontal portions of the said pipes 23, the same being conveniently made of tubes with plural lines of perforations or flame ports 33. As shown, the several tubes may be coupled at their outer ends with the said pipe portions, and arranged to bear at their inner ends upon oppositely-disposed flanges 34, 35, of a central support 36, extending from the front cross-piece 27 to the transverse support 28 at the rear. It will be noted that this arrangement enables the two series of burners to slide easily into position inside the combustion chamber, each series as a whole, together with the gas-pipes thereto connected. The perforations 33 are directed downward, so that the fuel gas will be lighted and caused to burn first below the tubes, as indicated at 37 in Fig. 1, with the burners of either or both of the said series enveloped by clear flames, and the products of combustion rising thereabove.

The flames ascending from the burners aforesaid are arranged to impinge upon refractory material, preferably formed into tablets, as 40 and 41, horizontally disposed and grouped so as to constitute the top of the combustion chamber previously mentioned. By preference also, two groups of such tablets are provided, corresponding to the series of subjacent burners 31 and 32, see Fig. 3. Each group may comprise three tablets laid in sequence one behind another, in a broiler of standard size, as illustrated in Fig. 1. The tablets in each group are held up from opposite sides by ledges 42 and channel-irons 43, respectively connected with the upper part of the casing and the central support for the burners. As seen in Figs. 2 and 3, the tablets slidably engage the ledges and channel-irons from the front to the rear of the casing, and therefore are readily inserted and removed, as required.

Apertures are provided in the said top of the combustion chamber to permit the escape of the smoke, fumes, or vapors that arise from the flames reaching the tablets of refractory material. As shown in Figs. 1, 2 and 3, these apertures may be produced by notches or incisions 45, made in both the front and rear edges, of the tablets, and forming intermediate slot-like openings when the tablets are set close to one another. The tablets are designed to reflect, absorb, and radiate the heat generated. It will be understood that part of the heat is immediately reflected downward, that is, from the moment the flames impinge upon the tablets, and part of it also is absorbed by the refractory material, which the latter subsequently radiates, upon reaching the state of incandescence. Meanwhile the products of combustion rising from the flames ascend, through the apertures 45, into the space 18, intervening between the tablets and the top of the jacket 15, thus leaving none but a clear fire in the combustion chamber. The external air entering through the open front of the casing 11 promotes combustion, and further assists in expelling the products thereof, which are carried out of the broiler through an exit flue 46, communicating with the said space 18, at the rear.

The jacket 15, which surrounds the casing 11, makes it possible to supplement the heat within the broiler by external application thereto of surplus heat derived from an outside source, such as a coal-burning range, or the like. To this end, the bottom of the jacket is provided with an inlet opening 49, adapted to receive the heat units or currents from the exterior source, for instance, through a smoke-pipe 50, or other suitable conduit. As indicated by the arrows in the drawings, the heat supplied through the opening 49 first enters the space 16, where it spreads under the casing. Thence the heat currents rise into the lateral spaces 17, and from the latter they reach the top space 18, which leads to the exit flue 46. The body of the casing being enveloped by the currents from the outside source of heat, the temperature inside the broiler is accordingly raised. The spaces 16, 17 and 18 thus act as heat-conveyors or heat-conveying passages between the outside source and the jacketed casing, and they coact besides with the open front of the casing 11 and the apertures 45 of the tablets 40 and 41, in creating a draft through the broiler which entrains the products of combustion arising from the burners and drives them out into the exit-flue. Thus, the use of the jacket around the broiler permits conservation of heat both within and without, promotes internal combustion, and helps to create inside a pure atmosphere through which the broiling of the food is considerably benefited. When the broiling is finished, the gaseous fuel may be cut off from the burners, and the externally applied heat alone depended upon to keep warm such food as for the time being remains in the casing. If the food be all removed the heat from both the interior and the exterior sources may be cut off at once.

A gridiron is employed to hold the food under the flame in the broiler, as usually done in other apparatus of the same class. As shown in Figs. 1 and 3, this gridiron may consist of a light rectangular frame 52, made of angle iron, and inclosing a set of parallel bars 53, placed on edge within the frame and fastened thereto at their opposite ends, which may be twisted for the purpose, as indicated at 54. A handle 55, secured to the front of the frame, about the middle thereof, completes the grid appliance.

The grid above described is slidably mounted in a carriage 57, consisting preferably of a couple of channel-irons turned edgewise to face each other, as in Fig. 3, and united by flat bars, 57$^a$ and 57$^b$ at the front and rear, respectively. The carriage 57 has rollers, as 58, 59, attached to its sides and made to engage inclined runways 60, 61, rigidly secured on the opposite side walls of the casing 11. Preferably two pairs of rollers and two pairs of runways are provided, so that the carriage is evenly supported from both sides, and the grid therein will be maintained in a level position. The arrangement, it will be seen, admits of the carriage being run up under the burners 31, 32, to hold the grid at the proper height to broil the food thereon, and brought down out of the heat zone as soon as the broiling is affected. When this is done, the food may either be taken off at once or allowed to remain on the grid and kept warm in the casing. In the latter case, the grid may be pushed back rearwardly of the carriage, as the channeled sides thereof will hold it firmly, without tilting, even though there are no back supports.

The combined grid and carriage therefor may be kept in any desired position, whether high, low, or intermediate, and moved up or down as required, by means of toggle-links, as 64 and 65, respectively connected to the carriage and to a rockshaft 66, which latter is normally held against rotation, by an arm 67, secured thereto, and a coil spring 68, anchored at one end to this arm and hooked at the other end to an eye-bolt 69, passing through the rear walls of the casing 11 and jacket 15. Two pairs of links are provided, and these are arranged to work in parallel vertical planes under the carriage. Preferably, the upper links 64 are pivotally connected to lugs 70, depending from the opposite sides of the carriage and located on a central line coinciding with the transverse axis thereof, midway between the respective pairs of rollers 58, 59 and runways 60, 61. The lower links 65 are rigidly attached to the shaft 66, which is laid across the heat-conveying passage 16, and journaled in suitable bearings, as 71, therein. The arm 67 and its retracting spring 68 can be placed in either one of the lateral heat-conveyors 17, and may be duplicated on the other side of the casing, the purpose thereof in each instance being to keep the combined grid and carriage normally raised.

To lower the said carriage and grid, the shaft 66 is rocked against the tension of the spring 68, through the agency of a hand-lever 74, fulcrumed as at 75, on top of the jacket 15, and pivotally attached to the upper end of a vertically-disposed connecting-rod 76, similarly attached at its lower end to an arm 77, projecting rearwardly from the said shaft. Rocking the latter causes the toggle-links 64 and 65 to be flexed at the joint thereof, and consequently to pull down the carriage with the grid therein, as indicated by dot-and-dash lines in Fig. 1. The lower links 65, it will be noted reach the rockshaft through slots 78, in the bottom of the casing 11, which slots are sufficiently elongated to admit of these links passing therethrough for their full length, when the grid and carriage are brought down to the lowermost position. See Fig. 2. A slot 79 is also provided in the top of the jacket 15, to let pass the upper end of the connecting rod 76, most of which, however, is received and operates in one of the lateral heat-conveying passages 17. The free end of the lever 74 is arranged to oscillate within a guide 80, provided at one side with a vertical series of upwardly-pointed teeth 81, designed to engage a projection 82, on the corresponding side of the lever, and keep it raised. Thus, ordinarily, the free end of the lever remains in an elevated position, so that the rock-shaft and parts controlled thereby may not be disturbed. When it is desired to rock the shaft, in order to draw down the carriage and grid, the projection 82 is disengaged from the teeth 81 by pushing the handle of the lever slightly to one side, and the lever may then be depressed to the required extent to accomplish the purpose in view.

Fig. 4 shows essentially the same construction and arrangement of parts as have already been described with reference to the other figures of the drawings, excepting that the hand-lever above mentioned is replaced by a draw-bar 85, pivoted directly to the arm 67 of the rockshaft 66. This draw-bar has teeth 86, adapted to engage the lower margin of a slot 87, provided in one side of the jacket 15 in the front. It is operated by means of a handle 88, in a manner that is readily understood.

In its broader aspects the invention is not limited to the precise mode of construction shown and described, nor to any particular construction by which the same may be carried into effect, as many changes may be made in the details thereof without departing from the main principles of the invention or sacrificing its chief advantages.

I claim:

1. A broiler including a combustion chamber, a grid therein, a carriage for said grid, inclined channels in said chamber located respectively forward and rearward at opposite sides of said carriage, and devices carried by the carriage and slidably engaged in said inclined channels.

2. A broiler including a combustion chamber, a grid therein, a carriage for said grid, inclined channels in said chamber located respectively forward and rearward at opposite sides of said carriage, and rollers on the latter engaging said channels.

3. A broiler including a combustion chamber, a grid therein, a carriage for said grid, inclined channels in said chamber located respectively forward and rearward at opposite sides of said carriage, devices carried by the carriage and slidably engaged in said inclined channels, and manually controlled means for adjusting the carriage upwardly or downwardly along the inclined channels to locate the grid in any desired position.

4. A broiler including a combustion chamber, a grid therein, a carriage for said grid, inclined channels in said chamber located respectively forward and rearward at opposite sides of said carriage, devices carried by the carriage and slidably engaged in said inclined channels, and manually controlled means for adjusting the carriage upwardly or downwardly along the inclined channels to locate the grid in any desired position, said means including a toggle system having its upper member connected to the carriage at a point intermediate the forward and rearward inclined channels.

In testimony whereof, I have affixed my signature hereto.

HENRY W. O'DOWD.